(12) United States Patent
Guerrera (10) Patent No.: US 12,450,195 B2
(45) Date of Patent: Oct. 21, 2025

(54) METHODS AND SYSTEM FOR MANAGING ACTIONS WITHIN AN ELECTRONIC DATA FILE

(71) Applicant: Kyocera Document Solutions Inc., Osaka (JP)

(72) Inventor: Michaela M. Guerrera, Berkeley, CA (US)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 18/138,343

(22) Filed: Apr. 24, 2023

(65) Prior Publication Data

US 2024/0354283 A1 Oct. 24, 2024

(51) Int. Cl.
*G06F 16/18* (2019.01)
*G06F 16/11* (2019.01)
*G06F 16/182* (2019.01)
*G06F 16/93* (2019.01)

(52) U.S. Cl.
CPC ........ *G06F 16/122* (2019.01); *G06F 16/1827* (2019.01); *G06F 16/93* (2019.01)

(58) Field of Classification Search
CPC .................................................. G06F 16/1827
USPC .......................................................... 707/822
See application file for complete search history.

(56) References Cited

U.S. PATENT DOCUMENTS

| 10,146,758 | B1 * | 12/2018 | Dorner | G06F 40/169 |
|---|---|---|---|---|
| 10,592,994 | B1 * | 3/2020 | Mishra | G06Q 40/123 |
| 11,334,147 | B1 * | 5/2022 | Upchurch | G06V 20/20 |
| 11,916,863 | B1 * | 2/2024 | Jepperson | H04L 51/224 |
| 2021/0303652 | A1 * | 9/2021 | Curzi | G06Q 50/01 |
| 2022/0405483 | A1 * | 12/2022 | Ho | G06F 40/247 |

* cited by examiner

*Primary Examiner* — Syling Yen
(74) *Attorney, Agent, or Firm* — Millen, White, Zelano & Branigan P.C.; William F. Nixon (57) ABSTRACT

An electronic file management system includes a cloud information manager that enables one or more operators to insert fields into electronic files, such as a document, that requires action on behalf of a user of the management system. A time limit is set to complete the action. A timer is set by the cloud information manager to complete the action. The cloud information manager also sends notifications to the users that they must take action with regards to the electronic file. When the time limit is reached, the cloud information manager determines whether the action is complete with regard to the applicable electronic file.

9 Claims, 6 Drawing Sheets

METHODS AND SYSTEM FOR MANAGING ACTIONS WITHIN AN ELECTRONIC DATA FILE

FIELD OF THE INVENTION

The present invention relates to a computing system for managing documents and data files by tracking and notifying users of actions to be taken on the document. More particularly, the present invention relates to setting a timer and notification within the document or data file to perform an action.

DESCRIPTION OF THE RELATED ART

Reminders to address tasks to be performed in relation to a data file, such as a document stored on a cloud-based server, may be done with email reminders. These reminders, however, are not tied or included in the document itself. Further, the steps taken after the email reminders are not resolving completion of the action that is sent back to the requesting entity.

SUMMARY OF THE INVENTION

A method for managing documents is disclosed. The method includes opening a document at a client device. The document is accessible using a cloud information manager at a document server. The method also includes inserting a field into the document. The field is embedded within the document. The method also includes creating an action to be taken within the field by a user of the document. The method also includes setting a time limit to complete the action. The method also includes enabling a timer from which at least one notification is generated for the user. The method also includes sending the at least one notification according to the timer. The at least one notification corresponds to the action to be taken. The method also includes stopping the timer when the time limit is reached. The method also includes determining whether the action is taken within the document within the time limit.

A method of managing data files within a system is disclosed. The method includes opening an electronic data file at a client device. The electronic data file is accessible using a cloud information manager at a document server. The method also includes inserting a field into the electronic data file. The field is embedded within the electronic data file. The method also includes creating an action to be taken within the field by a user of the system. The method also includes setting a time limit to complete the action. The method also includes enabling a timer from which at least one notification is generated for the user. The method also includes sending the at least one notification within the system according to the timer. The at least one notification corresponds to the action to be taken. The method also includes stopping the timer when the time limit is reached. The method also includes determining whether the action is take according to the electronic data file within the time limit.

A system is disclosed. The system includes a processor and a memory. The memory stores instructions. When the instructions are executed by the processor, the system is configured to open an electronic data file at a client device. The document is accessible using a cloud information manager at a document server. The system also is configured to insert a field into the electronic data file. The field is embedded within the electronic data file. The system also is configured to create an action to be taken within the field by a user of the system. The system also is configured to set a time limit to complete the action. The system also is configured to enable a timer from which at least one notification is generated for the user. The system also is configured to send the at least one notification within the system according to the timer. The at least one notification corresponds to the action to be taken. The system also is configured to stop the timer when the time limit is reached. The system also is configured to determine whether the action is taken according to the electronic data file within the time limit.

BRIEF DESCRIPTION OF THE DRAWINGS

Various other features and attendant advantages of the present invention will be more fully appreciated when considered in conjunction with the accompanying drawings.

DETAILED DESCRIPTION OF THE PREFERRED EMBODIMENTS

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims.

The disclosed embodiments provide a reminder notification of when tasks or actions for documents are due by a certain date or time. The user or operator may select a checkbox, or stopwatch icon, to activate this feature to remind those who need to sign documents on a timed basis. In other words, if the person who is providing the documents needs the documents urgently, then the reminder emails or notifications within the platform will prompt the user every hour or every day in order to receive the documents on time. Reminders are not limited to every hour or day, but may be configured to provide reminders as needed.

The disclosed embodiments include a timed-reminder feature with documents in return. The disclosed embodiments also include a countdown reminder feature with a task or action to be completed in return. Reminders may be sent hourly, daily, or even every other day, weekly, and the like depending on the due date of when the documents or the task need to be completed. Reminder notifications, emails, or application reminders may be sent, in which the user is taken to a place to complete the document or task. The reminders include an alert so that one is alerted of when something is going to occur or needs to occur. One difference from known reminder system is that the task or action need to be completed in return. Thus, the disclosed embodiments differ from reminder processes.

A pop-up configuration may be implemented within a product. A notification pop-up, such as on a mobile device, could be implemented using a square or button. Once clicked, the link or button may direct a user to the application or online platform to get the action performed or task completed, such as signing a document. This action or task may be taken at a cloud-based server.

An example process may be disclosed. An operator may log into a document management system. The operator may upload and open a document at a client device. The operator may review the document and insert a signature field or an annotation, such as a "sticky note," into the specific area or page of the document. The annotation includes a requirement or a question to be answered. The operator also assigns the person to complete the action, such as by signing the document or replying to the question. In doing so, the operator may check a history on how long it takes to sign or reply for each user. This feature may help decide whom to assign.

The disclosed embodiments may set a time limit for a task and reminder message sent to the applicable user or users. The disclosed process starts a timer and notifies the assigned person. The timer may be displayed in the document and the time limit can be changed anytime. The disclosed processes sends a reminder to the assigned person based on the reminder setting. The assigned person signs or replies to the annotation, or completes the task. The disclosed process may record the time that the assigned person takes to sign the document or reply. After completing the task, the annotation may be hidden or removed from the document. Notifications may be sent to particular users, other than assigned users, when the time limit is approaching. Further, another person may answer for the assigned person.

Figure 1:
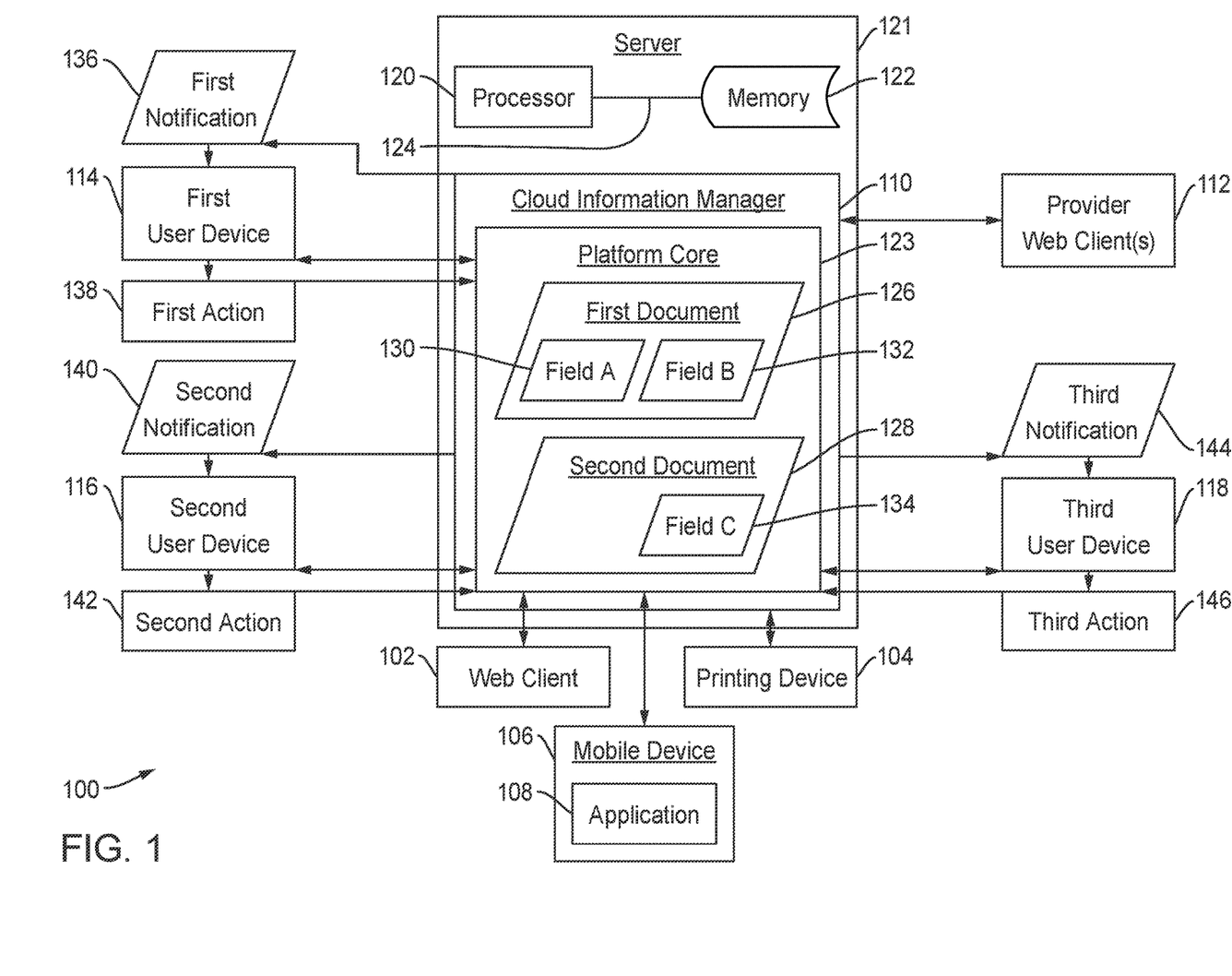
FIG. 1 illustrates an electronic file management system according to the disclosed embodiments.

FIG. 1 depicts a block diagram of an electronic file management system 100 for managing electronic files or documents according to the disclosed embodiments. The term "electronic file" also may refer to electronic documents, or documents stored within management system 100. In addition to documents, electronic file may refer to programs or any data stored in an electronic format. The disclosed embodiments may set tasks to be accomplished with regard to the electronic file. For example, a task, or action, may be to sign a document. Another may be to review a portion of an electronic file. The user performs the task and indicates completion using management system 100.

Components within management system 100 may vary. Cloud information manager 110 may be an application or service located at a server or a plurality of servers 121 that provide the platform for management electronic files within management system 100. Cloud information manager 110 also may be a provider portal to communicate with provider web client or clients 112. An administrator, user, or customer can access cloud information manager 110 using a web browser. The administrator may add user accounts for their own organization and configure settings related to electronic file class access rights. Customer or users can manage the electronic files using operations related to scan, upload, index, search, edit, and the like.

The disclosed embodiments use cloud information manager 110 to install and track actions that need to be taken with regard to the electronic files stored thereon. An operator or user may insert the task into the electronic file. Cloud information manager 110 then alerts assigned entities to complete the actions. It also may send reminders to make sure the actions are performed. Once the actions are complete, or not complete, cloud information manager 110 alerts the operator so that further action may be taken.

Cloud information manager 110, as disclosed above, may be implemented on a server 121 within management system 100. Server 121, therefore, includes one or more processors 120 to execute instructions stored in memory 122. Computer bus 124 allows data to be exchanged within cloud information manager 110. Memory 122 may be one or more locations of memory. Memory 122 may store instructions that configure cloud information manager 110 to perform operations, as disclosed below.

Cloud information manager 110 also may include platform core 123. Platform core 123 may store documents accessible by management system 100. Platform core 123 may securely store all the information for the documents as well. In some embodiments, platform core 123 may be a server. For example, first document 126 and second document 128 may be stored at platform core 123. Cloud information manager 110 may access these documents and make them available within management system 100. In some embodiments, platform core 123 may be implemented at server 121.

Management system 100 also includes components that access platform core 123 using cloud information manager 110. Web client 102 may provide full document management using a web browser on a client device, such as a desktop or mobile computing device. An operator may access electronic files, such as first document 126 and second document 128, using cloud information manager 110. Instructions provided at web client 102 cause cloud information manager 110 to take the associated action on the document at platform core 123.

Printing device 104 may be a multi-functional peripheral that provides printing, copying, scanning, faxing, and the like within management system 100. Any number of printing device 104 may be implemented within management system 100 and has access to cloud information manager 110. Printing device 104 is disclosed in greater detail by FIG. 2. In some embodiments, printing device 104 scans and uploads documents to platform core 123 using cloud information manager 110. Cloud information manager 110 may include instructions or policies on how to manager uploaded files to platform core 123.

Mobile device 106 may represent one or more mobile devices connected to cloud information manager 110 within management system 100. Mobile device 106 may capture an image or other data and upload it to platform core 123 using cloud information manager 110. Thus, as disclosed above, not all electronic files are documents. Some electronic files may be data provided by a component. In addition to images, mobile device 106 may capture, for example, measurement data, metadata, or any other information that may be stored at platform core 123. Mobile application 108 on mobile device 106 connects to cloud information manager 110 to interact accordingly.

Provider web client or clients 112 may be one or more web clients that provide organization management of electronic files on platform core 123. Administrators or employees may use devices having provider web client 112 executing thereon to access cloud information manager 110 and any documents stored on platform core 123. Users of provider web client 112 may set policies on document access and treatment of electronic files scanned or uploaded by printing device 104 or mobile device 106.

Web client 102, printing device 104, and mobile device 106 using mobile application 108 may connect to cloud information manager 110 to access electronic files on platform core 123. For example, these components may access first document 126 and second document 128. Platform core 123 may stores 1000s or more of files. Cloud information manager 110 may manage access to all the files. In addition to opening and editing first document 126 or second document 128, the disclosed embodiments may enable the insertion of fields into the document. Some fields may include comments or notes. Other fields, however, may include an action to be taken by a user of the document.

Thus, first document 126 may include field A and field B. Field A may be created and inserted into first document 126 by an operator at web client 102. Field B may be created and inserted into first document 126 by an operator at mobile device 106. Second document 128 also may include field C, which is inserted by another operator at web client 102. Some or all of these fields may require an action being taken with regards to the corresponding document. For example, field A may an action to request that a user of document 126 review a graphic image placed in the document to approve. Field B may include an action to request that another user sign document 126. Field C may include an action to have yet another user review and sign document 128.

After the fields are inserted, cloud information manager 110 may alert the user, through their user devices, to review the documents and complete the action. Management system 100 includes first user device 114, second user device 116, and third user device 118. User devices 114-118 may be client devices, computing devices, and the like that are accessed by the users to interact with cloud information manager 110. The user devices also may include an application like mobile application 108 to access cloud information manager 110 and platform core 123.

An example process is disclosed. After field A is inserted into document 126, cloud information manager 110 is notified by platform core 123 that an action is to be taken in relation to the document. Cloud information manager 110 sends first notification 136 to first user device 114. First notification 136 may be an email, message, text, and the like provided to first user device 114. Preferably, the user of first user device 114 will receive first notification 136 and engages cloud information manager 110 to complete first action 138 required by field A. Using first user device 114, the user may open first document 126 and view field A to determine what action needs to be taken. As noted above, field A may require the user to review and approve a graphic image within first document 126. First action 138 may be the review and approval/disapproval of the image.

The same operations may executed for fields B and C. Cloud information manager 110 sends second notification 140 to second user device 116. The user of second user device 116 receives second notification 140 and engages cloud information manager 110 to complete second action 142 required by field B in document 126. Using second user device 116, the user may open first document 126 and view field B to determine what action is to be performed. As disclosed above, field B may require the user to sign document 126. Second action 142 may be signing first document 126 using cloud information manager 110.

Field C in second document 128 may act the same way as field B, except that it requires action by a different user. Thus, cloud information manager 110 sends third notification 144 to third user device 118. The user of third user device 118 receives third notification 144 and engages cloud information manager 110 to access second document 128. Using cloud information manager 110, the user of third user device 118 performs third action 146 as required by field C, which, in this instance, is signing second document 128.

Cloud information manager 110 may track the notifications and actions that are set forth by the fields within the documents. It also may determine when the actions are complete and alert the operators that inserted the fields into the documents. Further operations with regard to creating, performing, and tracking actions to be taken using cloud information manager 110 are disclosed below.

It should be noted that even though first user device 114, second user device 116, and third user device 118 are shown separate from web client 102, printing device 104, mobile device 106, and provider web clients 112, the user devices may be these components of management system 100. For example, web client 102 may be hosted on first user device 114. Cloud information manager 110 may send notifications and enable the performance of actions between any of the devices or components shown in FIG. 1.

Figure 2:
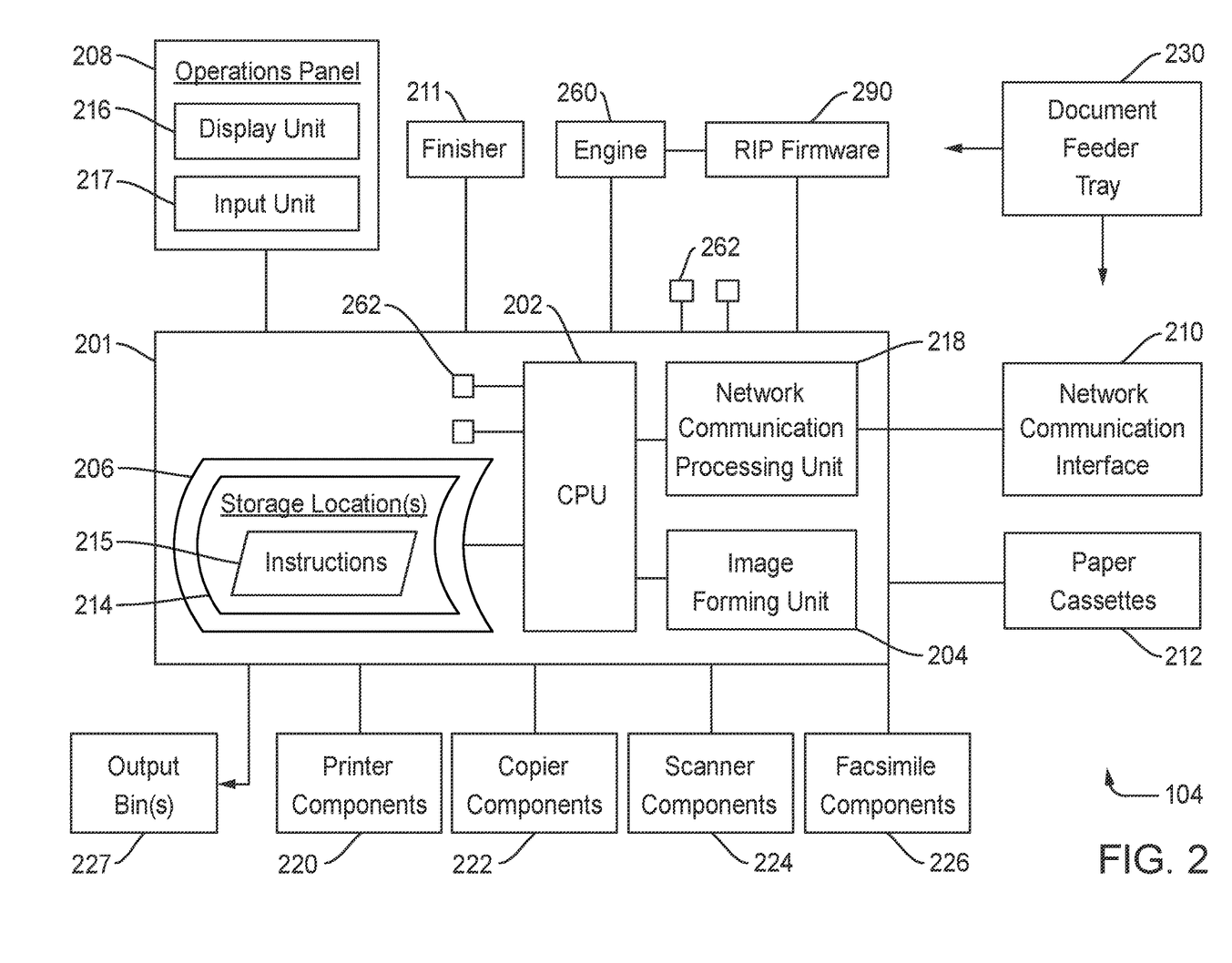
FIG. 2 illustrates a block diagram of components of the printing device for use within the computing system according to the disclosed embodiments.

FIG. 2 depicts a block diagram of components of printing device 104 according to the disclosed embodiments. The architecture shown in FIG. 2 may apply to any multi-functional printing device or image forming apparatus that performs various functions, such as printing, scanning, storing, copying, and the like within management system 100. As disclosed above, printing device 104 may send and receive data to platform core 123 using cloud information manager 110 and other devices within management system 100.

Printing device 104 includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Printing device 104, using computing platform 201, may be configured to perform various operations, such as scanning, copying, printing, receiving or sending a facsimile, or document processing. As such, printing device 104 may be a printing device or a multi-function peripheral including a scanner, and one or more functions of a copier, a facsimile device, and a printer. To provide these functions, printing device 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device 104 also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like.

Paper cassettes 212 supply paper to various components 220, 222, 224, and 226 to create the image formed surfaces on the papers. Paper cassettes 212 also may be known as paper trays. Paper cassettes 212 may include papers having various sizes, colors, composition, and the like. Papers or media within paper cassettes 212 may be considered "loaded" onto printing device 104. The information for printing these papers may be captured in a paper catalog stored at a controller, or digital front end (DFE), of printing device 104. Paper cassettes 212 may be removed to refill as needed. The printed papers from components 220, 222, 224, and 226 are placed within one or more output bins 227. One or more output bins 227 may have an associated capacity to receive finished print jobs before it must be emptied or printing paused. The output bins may include one or more output trays.

Document processor input feeder tray 230 may include the physical components of printing device 104 to receive papers and documents to be processed. Feeder tray also may refer to one or more input trays for printing device 104. A document is placed on or in document processor input feeder tray 230, which moves the document to other components within printing device 104. The movement of the document from document processor input feeder tray 230 may be controlled by the instructions input by the user. For example, the document may move to a scanner flatbed for scanning operations. Thus, document processor input feeder tray 230 provides the document to scanner components 224. As shown in FIG. 2, document processor input feeder tray 230 may interact with print engine 260 to perform the desired operations.

Memory unit 206 includes memory storage locations 214 to store instructions 215. Instructions 215 are executable on CPU 202 or other processors associated within printing device 104, such as any processors within components 220, 222, 224, or 226. Memory unit 206 also may store information for various programs and applications, as well as data specific to printing device 104. For example, a storage location 214 may include data for running an operating system executed by computing platform 201 to support the components within printing device 104. According to the disclosed embodiments, memory unit 206 may store the tokens and codes used in performing the deferral operations for printing device 104.

Memory unit 206 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause processing device 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause printing device 104 to act as a printer, copier, scanner, and a facsimile device.

Printing device 104 also includes an operations panel 208, which may be connected to computing platform 201. Operations panel 208 may include a display unit 216 and an input unit 217 for facilitating interaction with a user to provide commands to printing device 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216. Using these components, one may enter codes or other information into printing device 104.

Printing device 104 also includes network communication processing unit 218. Network communication processing unit 218 may establish a network communication using network communication interface 210, such as a wireless or wired connection with one or more other image forming apparatuses or a network service. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 104. CPU 202 also may retrieve information stored in memory unit 206, such as settings for printing device 104.

Printing device 104 also includes print engine 260, as disclosed above. Engine 260 may be a combination of hardware, firmware, or software components that act accordingly to accomplish a task. For example, engine 260 is comprised of the components and software to print a document. It may receive instructions from computing platform 201 after user input via operations panel 208. Alternatively, engine 260 may receive instructions from other attached or linked devices.

Engine 260 manages and operates the low-level mechanism of the printing device engine, such as hardware components that actuate placement of ink or toner onto paper. Engine 260 may manage and coordinate the half-toner, toner cartridges, rollers, schedulers, storage, input/output operations, and the like. Raster image processor (RIP) firmware 290 that interprets the page description languages (PDLs) would transmit and send instructions down to the lower-level engine 260 for actual rendering of an image and application of the ink onto paper during operations on printing device 104. RIP firmware 290 may be located in DFE 106, as disclosed above.

Printing device 104 may include one or more sensors 262 that collect data and information to provide to computing platform 201 or CPU 202. Each sensor 262 may be used to monitor certain operating conditions of printing device 104. Sensors 262 may be used to indicate a location of a paper jam, failure of hardware or software components, broken parts, operating system problems, document miss-feed, toner level, as well as other operating conditions. Sensors 262 also may detect the number of pages printed or processed by processing device 104. When a sensor 262 detects an operational issue or failure event, it may send a signal to CPU 202. CPU 202 may generate an error alert associated with the problem. The error alert may include an error code.

Some errors have hardware-related causes. For example, if a failure occurred in finisher 211, such as a paper jam, display unit 216 may display information about the error and the location of the failure event, or the finisher. In the instance when the paper jam occurs in paper cassettes 212, display unit 216 displays the information about the jam error as located in one of the paper cassettes.

Some errors have a type of firmware-related cause. For example, network communication processing unit 218 may cause a firmware or software error. Display unit 216 may display the firmware-related error, any applicable error codes, and provide recommendations to address the error, such as reboot the device.

Memory unit 206 may store the history of failure events and occurred errors with a timestamp of each error. Printing device 104 communicates with other devices within system 100 via network communication interface 210 by utilizing a network protocol, such as the ones listed above. In some embodiments, printing device 104 communicates with other devices within system 100 through REST API, which allows the server to collect data from multiple devices within system 100. REST API and SOAP are application protocols used to submit data in different formats, such as files, XML messages, JSON messages, and the like. By utilizing applicable network communication protocols and application protocols, printing device 104 submits and receives data from cloud information manager 110 as well as other devices within management system 100.

Figure 3:
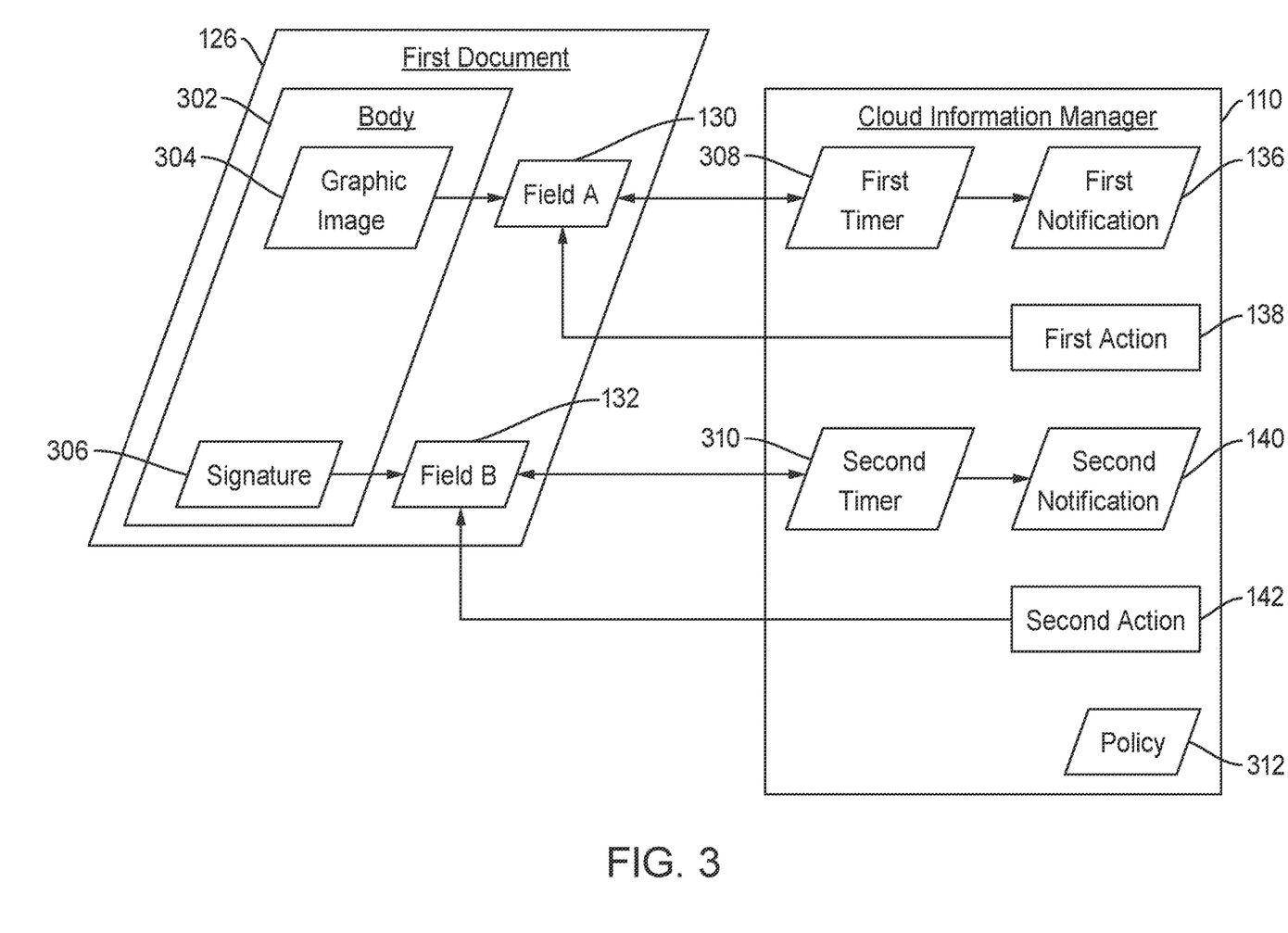
FIG. 3 illustrates a cloud information manager managing fields and actions to be taken within management system according to the disclosed embodiments.

FIG. 3 depicts cloud information manager 110 managing fields and actions to be taken within management system 100 according to the disclosed embodiments. Cloud information manager 110 may access first document 126 located on platform core 123. Cloud information manager 110 manages access, edits, review, and other actions taken with regard to first document 126. The same features may apply to second document 128, but are not repeated here.

One feature provided by cloud information manager 110 is the ability to place tasks or actions within first document 126 that require notification and resolution by one or more users. The disclosed embodiments may include fields within an electronic file, or document, that prompt cloud information manager 110 to manage the actions and track the performance. As noted above, field A may require that one or more users review a graphic image 304 within body 302 of first document 126. Body 302 may include text and images within first document 126. Field B may require another user sign first document 126 in signature block 306, also located in body 302.

In another example, the electronic file may be a captured or scanned image uploaded to platform core 123 using cloud information manager 110. Fields may be added to indicate portions of the image that may be of interest to users, such as something showing an important item captured in the image. In yet another example, the electronic file may be a program to be executed at a device in management system 100. An operator may place fields in the program to have another user correct portions of the program. All these examples include an action that must be taken regarding the document or electronic file.

Fields may be placed into first document 126 using cloud information manager 110. When a field is created and inserted into first document 126, a timer is enabled to begin counting down a time period in which the action related to the field is to be complete. Each field may include its own timer. Thus, cloud information manager 110 enables first timer 308 when field A is inserted into first document 126. In creating field A, the operator sets a time limit to complete the action. The operator also may set a frequency at which reminders or notifications are sent to the one or more users to complete the action. First timer 308 uses these values to configure itself to monitor completion of the action within field A.

Cloud information manager 110 also enables second timer 310 when field B is inserted into first document 126. Field B may specify a different time limit and notification frequency than field A. Thus, second timer 310 may be configured differently than first timer 308. Cloud information manager 110 may generate any number of timers depending on the number of fields created within first document 126. It also enables a timer for field C of second document 128.

After creation and enablement of the timers, cloud information manager 110 then generates and sends notifications to the user devices of the users listed in the fields. These users need to complete the actions within the fields before the timers reach their completion. Thus, cloud information manager 110 generates first notification 136 based on first timer 308 and information provided in field A. First timer 308 may enable the sending of notifications on a reoccurring basis, such that notifications are sent every hour, day, number of days, week, and the like. Cloud information manager 110 also generates second notification 140 based on second timer 310 and information provided in field B. Second timer 310 also enables the sending of notifications, possibly on a different schedule than first timer 312.

First notification 136, as disclosed above, is sent to first user device 114 to prompt a user to complete an action set forth in field A. Second notification 140 is sent to second user device 116 to complete the action set forth in field B. Cloud information manager 110 is accessed by the users via first user device 114 and second user device 116 to complete the actions. Timers 308 and 310 may continue to send notifications to complete the actions until notified by cloud information manager 110 to stop.

Thus, cloud information manager 110 allows the user of first user device 114 to complete first action 138. First document 126 may be displayed on first user device 114, including graphic image 304. First timer 308 also may be displayed with field A to indicate how much time is left to complete the action. In field A, the user may interact with cloud information manager 110 to indicate approval or disapproval of graphic image 304. First action 138 is complete. Cloud information manager 110 determines that the action specified in field A is completed. Cloud information manager 110 may close and remove field A from first document 126. First timer 308 may be stopped and the time to completion and other data noted.

Cloud information manager 110 also allows the user of second user device 116 to complete second action 142. First document 126 may be displayed on second user device 116 along with second timer 310. Signature block 306 also may be displayed, with an indication from field B to sign first document 126. The user of second user device 116 signs first document 126 using cloud information manager 110. Cloud information manager 110 may determine that the document is signed and close field B. Second timer 130 may be stopped and the time to complete second action 142 noted. All this information regarding first timer 308 and second timer 310 may be compiled by cloud information manager 110.

Cloud information manager 110 tracks the completion of first action 138 and second action 140. It also managers first timer 308 and second timer 310. Cloud information manager 110 does this in a centralized location within management system 100. The setting of actions to be taken is not performed at the device level, wherein the users set up widgets to performed these tasks. Instead, the fields are inserted in the document and a centralized manager sends the notifications and tracks completions.

This centralized configuration allows an administrator to implement policies and limit access to documents and electronic files on platform core 123. It also allows limits and rules to be placed on prescribing actions to be taken and what users may be notified. For example, policy 312 may prohibit certain users from being tasked with actions to be completed. Further, a limit on how long a time period may be implemented by a timer may be specified. Provider web client 112 may be create and update policy 312 as needed within cloud information manager 110.

Figure 4:
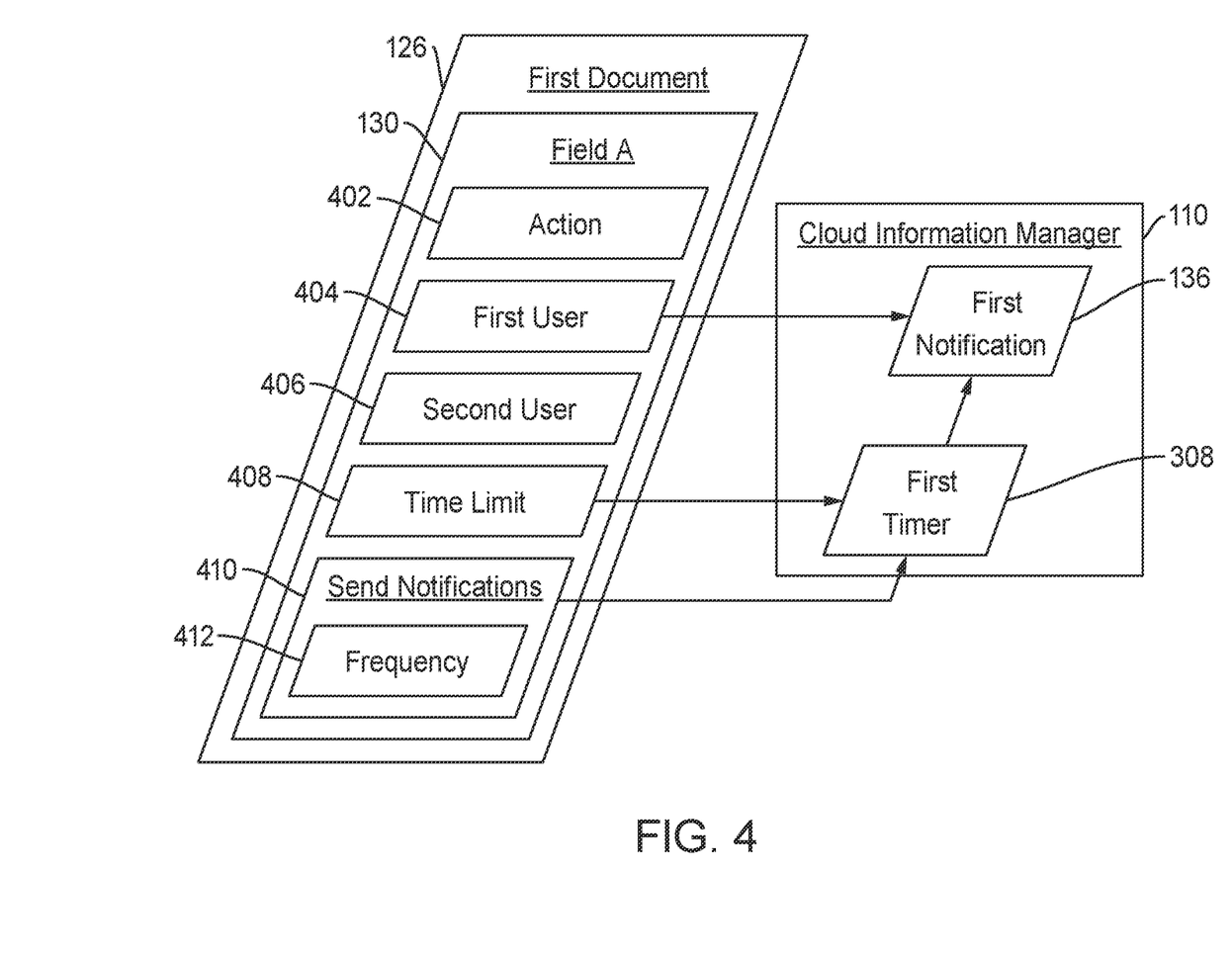
FIG. 4 illustrates a block diagram of a field as inserted into a first document according to the disclosed embodiments.

FIG. 4 depicts a block diagram of field A as inserted into first document 126 according to the disclosed embodiments. Field A may be inserted by the operator interacting with cloud information manager 110 to place the field into the document. The operator may open the document on a client device to view. Using a graphical user interface, the operator opens a new field inside first document 126. The operator then populates field A with data that is used to track and complete an action. As disclosed above, cloud information manager 110 performs these operations.

Within field A, sub-fields may be generated to capture data and information to enable the tracking and performing of the actions by cloud information manager 110. For action, action sub-field 402 may be where the operator creating field A inputs the task to be completed. This information will be provided in the notifications sent by cloud information manager 110. Using the example above, the text in action sub-field 402 may instruct a user to review graphic image 304 in first document 126. Action sub-field 402 also may include buttons or other graphic interfaces to provide to the user. The user may interact with the buttons or graphic interfaces at first document 126 using cloud information manager 110.

First user sub-field 404 may include contact information for the first user to take action with regards to field A. Second user sub-field 406 also may include contact information for the second user to take action with regards to field A. In some embodiments, the operator may only have one user sub-field. In other embodiments, multiple user sub-fields may be used to contact multiple users to complete the action specified in action sub-field 402. Contact information may include a user name, email address, phone number, identification number, and the like. Cloud information manager 110 uses this data to generate notifications to the respective user or users.

In some instances, cloud information manager 110 may assign one or more users to complete the action. Some organizations or situations may wish to use random assignment of users. Reasons for this feature may be to balance workload or not have actions being completed by preferred users. Further, policy 312 may specify that certain users only be used for specific actions. For example, an executive level user may only be allowed to sign documents using cloud information manager 110. Cloud information manager 110 also may check a history to determine how long it takes to perform actions for each user. Thus, cloud information manager 110 may forward notifications to those users who respond quickly. These features may be set in policy 312.

Time limit sub-field 408 may be where the operator places a time limit or time period to complete the action specified in action sub-field 402. This information may be a specific date and time, such as Apr. 12, 2023, at 3 pm. It also may be a time period, such as 24 hours. This data is used by cloud information manager 110 to set up and enable timers. Thus, time limit sub-field 408 may be used to generate first timer 308. First timer 308 may apply to actions taken by the first user specified in first user sub-field 404 and second user sub-field 406.

First timer 308 also may be used to trigger when and how often notifications are sent through cloud information manager 110. Send notifications sub-field 410 may be used to indicate whether notifications should be sent. Frequency menu 412 may be a drop down menu that allows the operator to select how often that notifications are sent via cloud information manager 110. The operator may be provided options, such as hourly, daily, and the like. Further, the operator may enter a notification frequency. This data may be provided to first timer 308, which then instructions cloud information manager 110 according to the input. First timer 308 instructs how often first notification 136 is sent. First timer 308 also may place how much time is left to complete the action within first notification 136.

Figure 5:
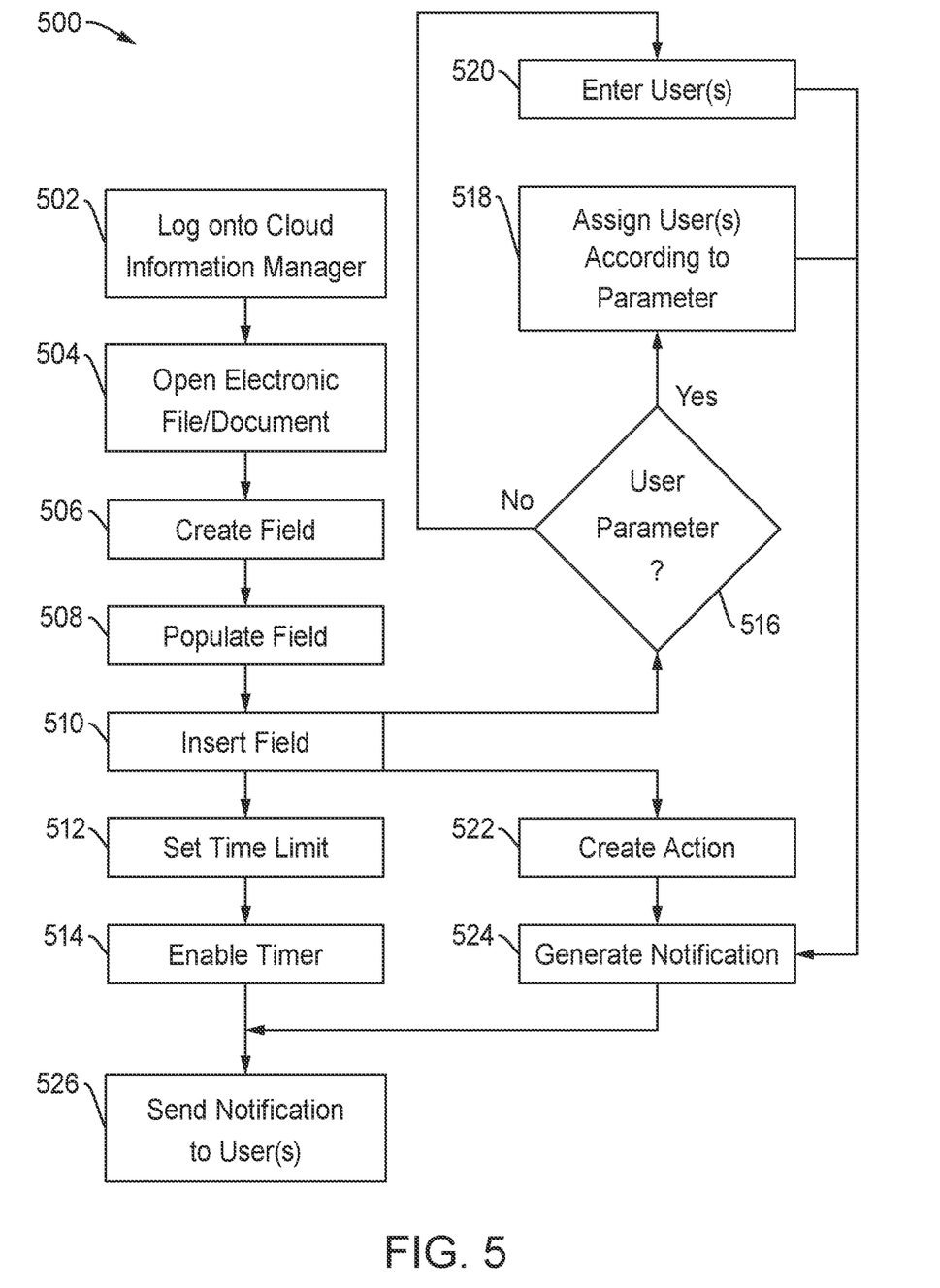
FIG. 5 illustrates a flowchart to insert a field into an electronic file or document and notify one or more users according to the disclosed embodiments.

FIG. 5 depicts a flowchart 500 to insert a field into an electronic file or document and notify one or more users according to the disclosed embodiments. Flowchart 500 may refer to FIGS. 1-4 for illustrative purposes. Flowchart 500, however, is not limited by the embodiments disclosed by FIGS. 1-4.

Step 502 executes by the operator logging onto cloud information manager 110 to access files within management system 100. The operator may use cloud information manager 110 to access an electronic file stored on platform core 123. Step 504 executes by opening the electronic file or document at the client device by the operator. For example, the operator may open first document 126 on mobile device 106 using mobile application 108. Modifications and changes to first document 126 are handled by cloud information manager 110 and made to the document stored on platform core 123. The operator may review first document 123 on mobile device 106.

Step 506 executes by creating a field, such as field A, in first document 126. The operator may select a "create field" or similar command that opens a field in the document. Preferably, the field is created near portions of the document desired by the operator to be part of the action to be taken. Step 508 executes by populating the field with data and information needed to create the action and for cloud information manager 110 to manage completion. Examples of data may be disclosed in FIG. 4 above. Prompts may be provided to elicit the information from the user, such as user information to complete the action, time limits, and the like. If needed, then the disclosed embodiments may create buttons or signature fields used to complete the action.

Step 510 executes by inserting the field, such as field A, into first document 126. Field A is viewable by other users accessing cloud information manager 110 to access first document 126. Step 510 also causes other steps to be executed simultaneously. These steps provide the timing, action, and user configurations needed to send notifications.

Step 512 executes by setting a time limit to complete the action. Time limit sub-field 408 may be used to set a value for the time limit to complete the action specified in action sub-field 402. Step 514 executes by enabling a timer, such as first timer 308. First timer 308 will use the data provided to set up the time limit and, in addition, how often to send notifications. Flowchart 500 may proceed to step 526 disclosed below.

Step 516 executes by determining whether the populated field instructs cloud information manager 110 to use a user parameter in determining which user or users to send the action. Cloud information manager 110 may use a parameter to determine which user or users to populate the user sub-fields for the inserted field. This step also may be executed after step 508. A parameter may be set by policy 312. For example, policy 312 may specify which users to use to complete specific actions, such as signing official documents. Another example of a parameter may be where the user are located or what department in which they work. More examples of parameters includes users that respond promptly to action requests.

If step 516 is yes, then step 518 executes by assigning the one or more users to complete the action for the field according to the parameter. If step 516 is no, then step 520 executes by entering the one or more users by the operator using the field. As disclosed above, field A may include first user sub-field 404 and second user sub-field 406. The operator may input contact information into these sub-fields to finalize generation of field A.

After step 510, step 522 also executes by creating the action to be performed using data and information from action sub-field 402. The action is "created" by cloud information manager 110 and used to track the action until it is completed. Steps 518, 520, and 522 then proceed to step 524, which executes by generating the notification for the field and action created therein. For example, first notification 136 may be generated using the user information and action information provided by field A. Step 524 then proceeds to step 526, which executes by sending the notification to the one or more users according to the time and frequency parameters set forth in field A. First timer 308 sends first notification using cloud information manager 110 using the time period and frequency data in field A.

Figure 6:
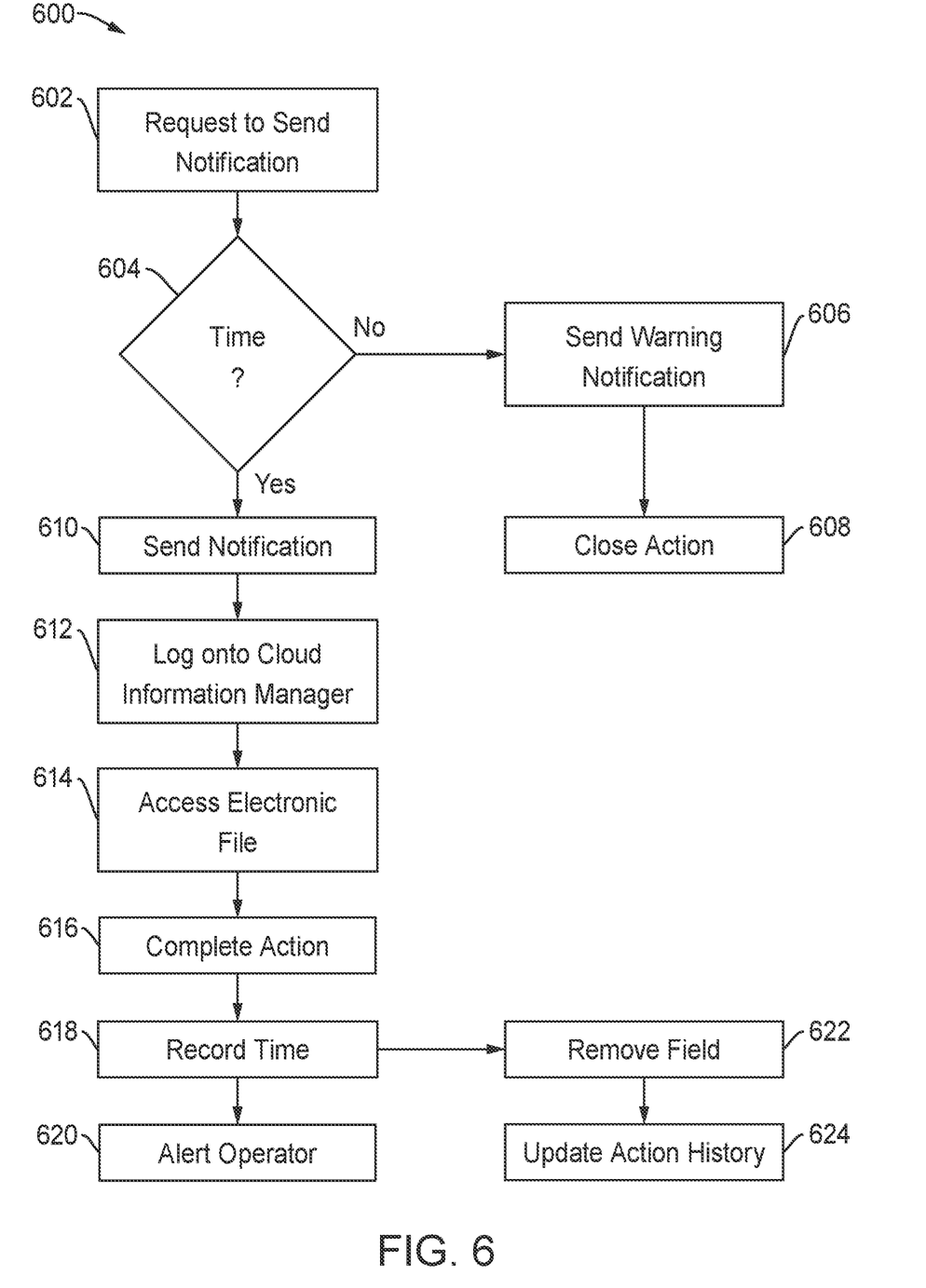
FIG. 6 illustrates a flowchart to complete an action using the cloud information manager according to the disclosed embodiments.

FIG. 6 depicts a flowchart 600 to complete an action using cloud information manager 110 according to the disclosed embodiments. Flowchart 600 may refer to FIGS. 1-5 for illustrative purposes. Flowchart 600, however, is not limited by the embodiments disclosed by FIGS. 1-5.

Step 602 executes by receiving a request to send a notification regarding the action to be completed corresponding to the inserted field, such as field A. A timer, such as first timer 308, may instruct cloud information manager 110 to send a notification based on the frequency specified to do so. It also may receive an instruction from the operator to send a reminder notification. Cloud information manager 100, however, needs to make sure there is time left to complete the action. As the time limit approaches, cloud information manager 110 may be prompted to send further reminder notifications.

Thus, step 604 executes by determining whether time is left according to first timer 308 to complete the action. Field A may specify a time limit to complete the action such as a time and date or time period. Step 604 determines if that time has passed. Step 604 also may determine whether the time limit is approaching. If so, then operations may be implemented to prompt the users to complete the action. Alternatively, the disclosed embodiments may determine if a maximum number of notifications is reached so that further notifications are not authorized.

If step 604 is no, then step 606 executes by sending a warning notification to the one or more users to complete the action for the corresponding field. The warning notification also may be sent to administrators or other users not specified in the field. For example, backup users may be called to complete the action if the primary users are not available. If the action is particularly time sensitive, then it cannot wait for the primary user to log onto cloud information manager 110. Step 608 executes by closing the action in the field. The operator or administrator may be notified by the warning notification to authorize additional time to keep the field open. Step 608 may allow for the time period to be extended.

If step 604 is yes, then step 610 executes by sending the notification. For example, first notification 136 is sent through cloud information manager 110 to first user device 114. Upon receipt of the notification, the user may take action. Step 612 executes by the user receiving the notification logging onto cloud information manager 110. The user may be directed by cloud information manager 110 to actions that need to be completed.

Step 614 executes by accessing the electronic file or document set forth in the corresponding field. For example, field A may specify the action is to be taken on first document 126. Cloud information manager 110 accesses first document 126 on platform core 123. Step 616 executes by the user completing the action specified by the field in the electronic file. For example, field A may specify that the user approve or disapprove graphic image 304 being first document 126. The user may select a button to approve the placement of graphic image 304. Other actions may include providing a signature that field A was reviewed.

Step 618 executes by recording the time when the action is completed by cloud information manager 110. Multiple steps may be executes subsequent to step 618. Step 620 executes by alerting the operator who created the field and action that the action is completed. An administrator also may be notified. Cloud information manager 110 may send the alert. Step 622 also executes by removing the field from the electronic file. Alternatively, the field may be left in the electronic file but no further notifications will be sent. Further, any associated timer may be closed and removed from cloud information manager 110. Step 624 executes by updating the action completion history for cloud information manager 110. The completion of actions may be tracked for further use or as a parameter in determining whether a user should be assigned an action to be completed.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements, or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more printing systems coupled to a network capable of exchanging information and data. Various functions and components of the printing system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

The invention claimed is:

1. A method of managing data files within a system, the method comprising:
    opening an electronic data file at a client device, wherein the electronic data file is accessible using a cloud information manager at a document server;
    inserting a first field and a second field into the electronic data file, wherein the first field and the second field are embedded within the electronic data file;
    creating a first action to be taken within the first field by a first user of the system and a second action to be taken within the second field by a second user of the system using the cloud information manager;
    setting a first time limit within the first field to complete the first action;
    setting a second time limit within the second field to complete the second action, wherein the first time limit is different from the second time limit;
    notifying the cloud information manager that the first field and the second field are inserted into the document;
    sending the electronic data file with the embedded first field and second field to the first user and the second user by the cloud information manager;
    enabling a first timer, by the cloud information manager, from which at least one notification is generated for the first action;
    enabling a second timer, by the cloud information manager, from which at least one notification is generated for the second action;
    tracking, by the cloud information manager, whether the first action and the second action have been executed;
    sending the at least one notification within the system according to the first timer and the second timer independently, by the cloud information manager, wherein the at least one notification corresponds to the first action and the second action to be taken;

stopping the timer when the time limit is reached; and determining whether the first action and the second action are taken according to the electronic data file within the first and the second time limits.

2. The method of claim 1, wherein the electronic data file includes a document.

3. The method of claim 1, wherein the electronic data file includes an email.

4. The method of claim 1, further comprising assigning the first and second users to the first and second actions according to a parameter.

5. The method of claim 1, further comprising detecting when the first and second actions are taken.

6. The method of claim 5, further comprising notifying the cloud information manager that the first action or the second action has been taken.

7. The method of claim 1, wherein the first and the second actions to be taken includes modifying the electronic data file.

8. The method of claim 1, wherein the electronic data file includes an electronic message.

9. The method of claim 8, wherein the first and the second actions to be taken includes responding to the electronic message.

* * * * *